United States Patent
Bouchez

(10) Patent No.: US 7,562,891 B2
(45) Date of Patent: Jul. 21, 2009

(54) CYCLE CRANKSET

(75) Inventor: Julien Bouchez, Saint Germain des Près (FR)

(73) Assignee: Look Cycle International, Nevers (FR)

( * ) Notice: Subject to any disclaimer, the term of this patent is extended or adjusted under 35 U.S.C. 154(b) by 51 days.

(21) Appl. No.: 11/826,110

(22) Filed: Jul. 12, 2007

(65) Prior Publication Data

US 2008/0012265 A1  Jan. 17, 2008

(30) Foreign Application Priority Data

Jul. 13, 2006  (FR)  ..... 06 06435

(51) Int. Cl.
*B62H 1/08* (2006.01)
(52) U.S. Cl. ..... 280/294
(58) Field of Classification Search ..... 280/293, 280/294
See application file for complete search history.

(56) References Cited

U.S. PATENT DOCUMENTS

| 4,893,523 | A | * | 1/1990 | Lennon | 74/594.6 |
| 2002/0002876 | A1 | * | 1/2002 | Bezet | 74/594.6 |
| 2004/0200314 | A1 | * | 10/2004 | Hermansen et al. | 74/594.1 |
| 2005/0204859 | A1 | * | 9/2005 | Winefordner et al. | 74/594.1 |
| 2006/0162489 | A1 | * | 7/2006 | Raad et al. | 74/594.7 |
| 2006/0236809 | A1 | * | 10/2006 | Bryne | 74/594.6 |
| 2006/0288819 | A1 | * | 12/2006 | Dal Pra' et al. | 74/594.3 |
| 2007/0137307 | A1 | * | 6/2007 | Gruben et al. | 73/774 |

FOREIGN PATENT DOCUMENTS

| DE | 44 04 796 A1 | 6/1995 |
| FR | 318 003 A | 10/1902 |
| FR | 572 587 A | 6/1924 |
| FR | 720 834 A | 2/1932 |
| FR | 720 835 A | 2/1932 |
| FR | 993 771 A | 11/1951 |
| FR | 2 416 829 A | 9/1979 |
| FR | 2 477 498 A | 9/1981 |
| FR | 2 528 377 A | 12/1983 |
| WO | 99/67125 A | 12/1999 |

* cited by examiner

*Primary Examiner*—Lesley D Morris
*Assistant Examiner*—Tashiana Adams
(74) *Attorney, Agent, or Firm*—Young & Thompson

(57) ABSTRACT

The crankset (1) includes two cranks (2) that extend in opposite directions on both sides of a crankset shaft (3), whereby each crank (2) is connected to the crankset shaft (3) at one of its ends and has, at its opposite end, a housing (4) that can accommodate a free end of a pedal shaft (5) by defining a distance between centers (L) between the crankset shaft (3) and the pedal shaft (5). The housing (4) is combined with elements (11, 12) for securing the pedal shaft (5) inside the housing (4). A positioning tip (7) is secured in an eccentric manner to the free end of the pedal shaft (5), and the positioning tip (7) is able to be accommodated in the housing (4) of the crank (2) in different angular positions so as to modify the distance between centers (L).

20 Claims, 3 Drawing Sheets

CYCLE CRANKSET

BACKGROUND OF THE INVENTION

1. Field of the Invention

This invention relates to a cycle crankset.

2. Description of the Related Art

Conventional cycle cranksets comprise two cranks that extend parallel to one another in opposite directions on both sides of a crankset shaft to which they are connected to drive in rotation during pedaling. At their free end, the cranks generally comprise securing means in the form of a threaded hole designed to accommodate the threaded end of a respective pedal shaft.

Just like the size of the frame, the length of the cranks corresponds to the morphology of the cyclist, in particular the length of the cyclist's legs. This crank length, however, cannot be directly proportional to leg length because technical parameters, such as, for example, ground clearance in turning, limit the possible variation.

Thus, the crank length generally varies in a total range of 170 to 180 mm, whereby the more common lengths are 170, 172.5 and 175 mm.

The length of the cranks is consequently generally fixed, which requires that the cyclist know—before purchasing the cycle—the recommended length for his use, on the one hand based on the length of his legs, and on the other hand based on the type of event in which he intends to participate. Actually, for example, a speed event over a short distance requires maximum power from the cyclist for a limited period, and this prompts him to increase the length of the lever arm defined by the cranks of the crankset and which corresponds to the distance or the distance between centers between the crankset shaft and the pedal shaft.

There is thus a need to be able to modify this distance between centers between the crankset shaft and the pedal shaft, and several devices are known that allow such a modification.

Thus, a certain number of devices are known in which an insert placed in a housing provided in the crank and comprising the threaded hole that accommodates the threaded end of the corresponding pedal shaft is used. The insert can be secured in different positions so as to make the distance between centers between the crankset shaft and the pedal shaft vary. This type of device is known from documents FR2416829, FR720835, WO99/67125, FR318003 and FR720834.

Another known device aims at optimizing the production of cranks by creating, starting from a fairly long common outline, different implantation positions for the threaded housing into which the threaded end of the pedal shaft is screwed to be secured there.

In the case of ultralight cranks made of composite materials, for example, it is also known to use an elongated metal insert to fill this role. Other more sophisticated devices exhibit a possible variation of the position of the pedal shaft by means of an eccentric or a spring barrel. Most of these additional devices involve only the single crank at the level of its connection, i.e., with the shaft of the crankset housing, or with the pedal shaft. The crankset shaft and the pedal shaft therefore remain unchanged in this case.

Also, another device of this type is known from FR 2 513 208, which describes a crankset in which a first and a second connection are secured in a bore that passes through each crank, starting from its two sides, with first and second assembly bores that are eccentric relative to the through bore. At least one of the assembly bores is provided with a threaded part that can be screwed into the shaft of the pedal, and an anti-rotation mechanism is provided to prevent the rotation of the connection. The connections are maintained on the crank with screws and optionally with a cup, said cup also being eccentric and placed opposite the threaded portion of the pedal shaft.

This device is also very bulky because it requires an element with threading that is designed to accommodate the pedal shaft, an element designed for the modification of the distance between centers, and additional securing elements, the entire unit in a limited space in the crosswise direction of the cycle, which is due to a maximum size for the spacing of the feet of the cyclist and therefore pedals.

All of these known devices comprise a very large number of parts machined with high precision, and, because of the masses of this additional device and the sizing of certain elements that should be sized to absorb very heavy stresses, among others the screwing torque of the pedal, the weight of the crank increases greatly.

BRIEF SUMMARY OF THE INVENTION

The object of the invention is to eliminate the drawbacks of the known cranksets that comprise means designed to allow a modification of the distance between centers between the crankset shaft and the pedal shaft, by proposing a crankset that is provided with an extremely simple and light device and that comprises a minimum number of parts and without having recourse to a separate insert.

One object of the invention is a cycle crankset, comprising two cranks that extend in opposite directions on both sides of a crankset shaft, whereby each crank is connected to said crankset shaft at one of its ends and has, at its opposite end, a housing that can accommodate a free end of a pedal shaft by defining a distance between centers between said crankset shaft and said pedal shaft, whereby said housing is combined with means for securing the pedal shaft inside said housing, whereby a positioning tip is secured in an eccentric manner to said free end of said pedal shaft, whereby said positioning tip is able to be accommodated in said housing of the crank in different angular positions so as to modify said distance between centers, whereby said angular positions are defined by flat surfaces placed uniformly on the periphery of said positioning tip and are able to work with at least one flat surface that is provided inside said housing of the crank, characterized by the fact that the peripheral surface of said positioning tip is generally conical, as well as the surface of the wall of said housing of the crank so as to be essentially complementary, and thereby said flat surfaces are tilted toward the end of said positioning tip, and wherein said at least one flat surface of said housing has the same slope.

According to other characteristics of the invention:

Said means for securing the pedal shaft inside said housing comprise a threaded connection that comprises a screw passing through a central hole passing through said housing to work with a threading that is provided at the end of said positioning tip;

At least three angular positions are provided:

A significant number of contiguous flat surfaces is provided so as to form facets of a positioning tip with a prismatic shape;

Indexing means of said positioning tip are provided;

Said indexing means comprise references around said housing and a marking on the face of the positioning tip rotated toward the pedal shaft.

Another object of the invention is a cycle that is provided with a crankset that has the essential characteristics of the invention.

BRIEF DESCRIPTION OF THE DRAWING FIGURES

Other characteristics and advantages of the invention will emerge from the following description of two non-limiting embodiments of the invention, with reference to the accompanying figures, in which.

In the figures, the identical or equivalent elements shall bear the same reference signs. Furthermore, only the left portion of the crankset is shown in the figures because the right portion is symmetrical to this left portion.

DETAILED DESCRIPTION OF THE INVENTION

Figure 1:
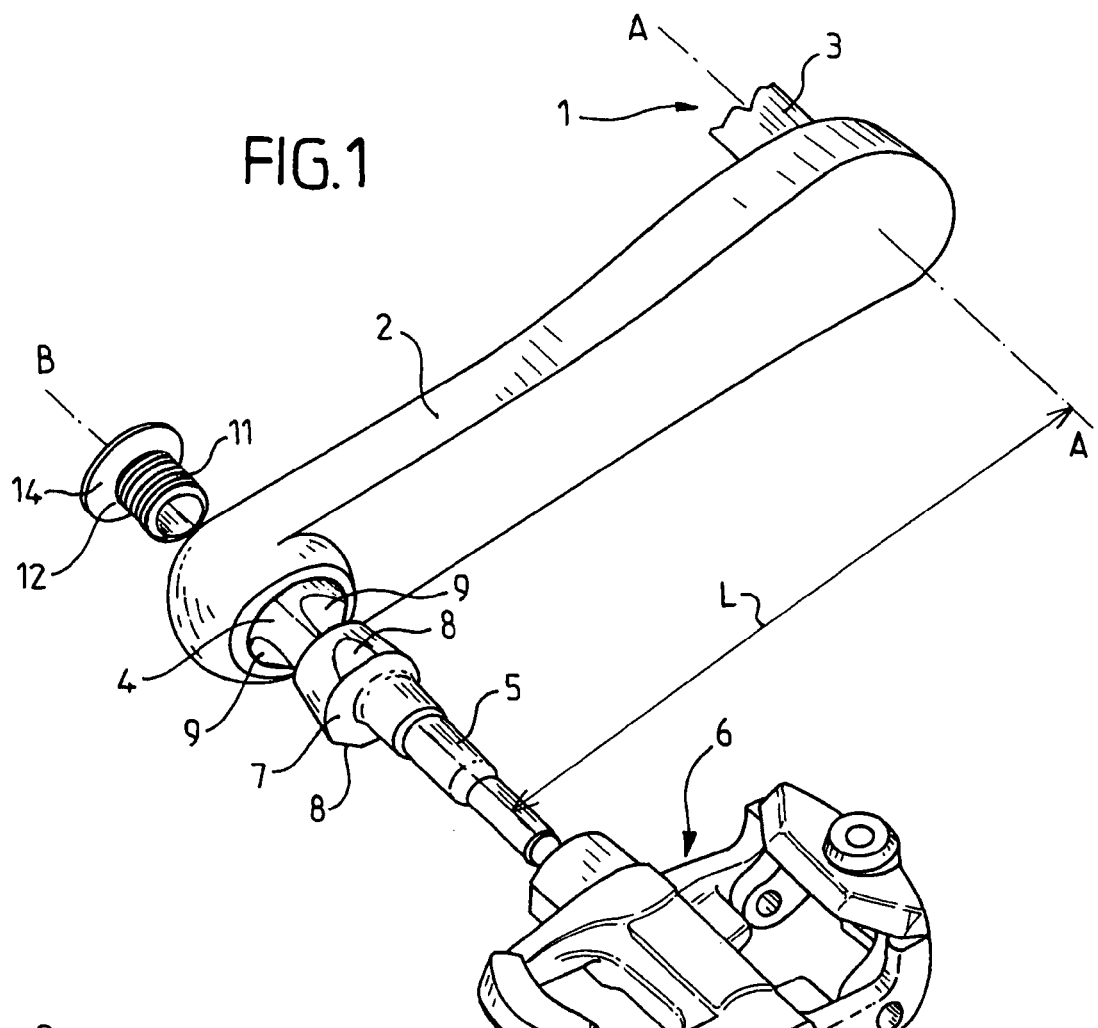
FIG. 1 is a partial exploded perspective view of a crankset according to the invention.
Figure 2:
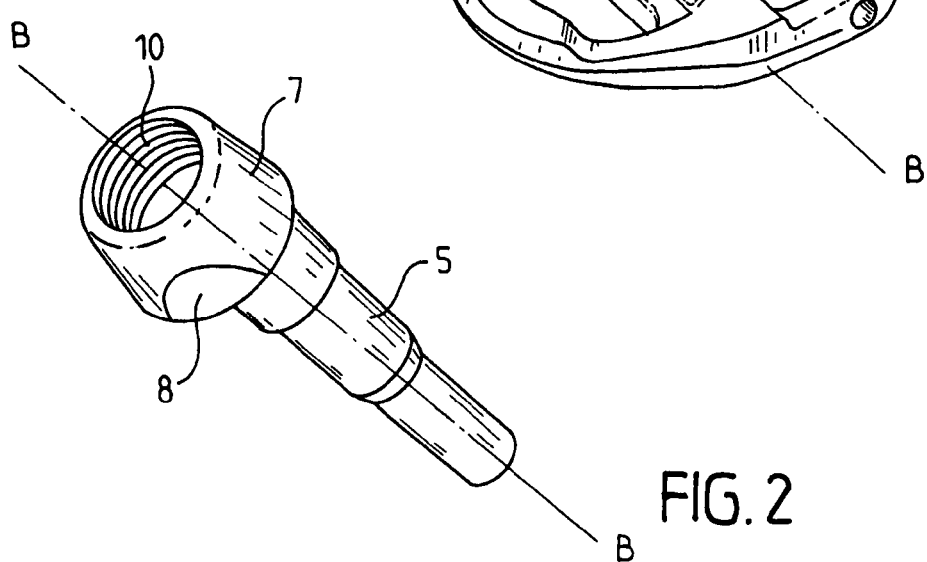
FIG. 2 is a perspective view showing a pedal shaft provided with a positioning tip according to the invention.
Figure 3:
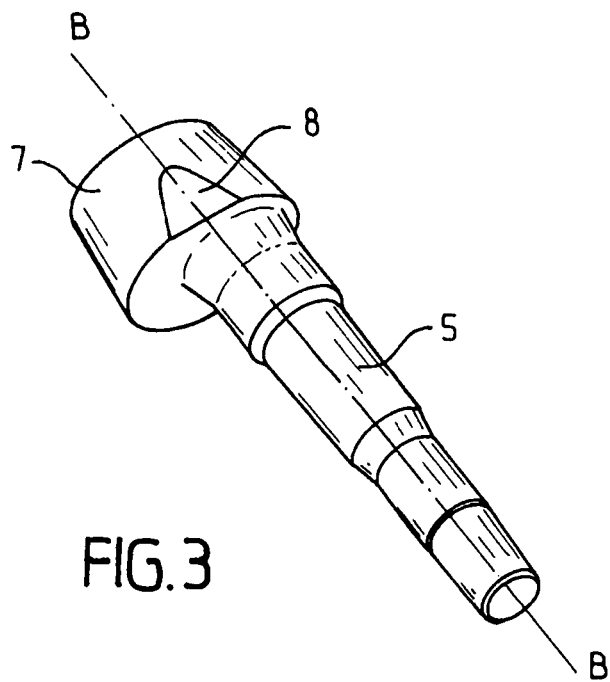
FIG. 3 is a perspective view showing the pedal shaft of FIG. 2 under another angle.
Figure 4:
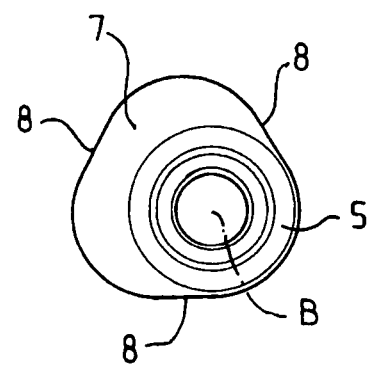
FIG. 4 is an end view of the pedal shaft of FIGS. 2 and 3.
Figure 5:
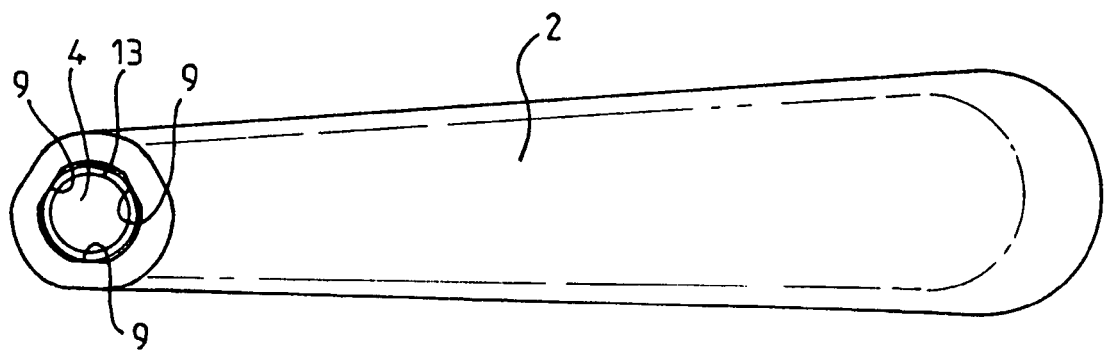
FIG. 5 is a side view of one of the crankset cranks showing the housing accommodating the tip of the pedal shaft.
Figure 6:
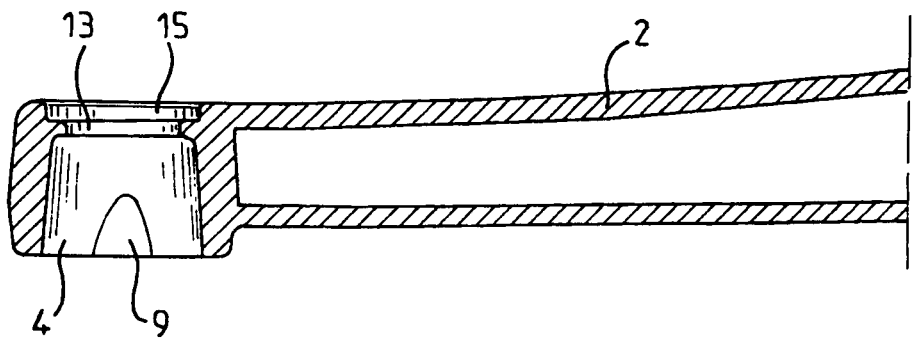
FIG. 6 is a longitudinal section of the crank of FIG. 5.

The entire set of essential elements is illustrated in FIG. 1. The left portion of a crankset 1 according to the invention is shown there. The crankset 1 comprises two cranks of which a single one (2) is shown. The cranks (2) extend parallel to one another in opposite directions on both sides of a crankset shaft 3.

At one of its ends, each crank 2 is connected to the crankset shaft 3 and in a conventional manner, at its opposite end, it has a housing 4 that is able to accommodate a free end of a pedal shaft 5. This housing 4 is combined with means for securing the pedal shaft 5, which will be described in detail later.

The pedal shaft 5 bears a pedal 6, which, in the illustrated example, is a left pedal that comprises means for automatic triggering of a plate (not shown) that is secured below the shoe of the cyclist. This pedal is well known in the field of the cycle and will not be described in more detail here.

The crankset shaft 3 (A-A) and the pedal shaft 5 (B-B) among them define a distance between centers with a length L.

The length L of the distance between centers can, according to the invention, be modified thanks to the fact that a positioning tip 7 is secured in an eccentric manner to the free end of the pedal shaft 5 and that this tip 7 is able to be accommodated in the housing 4 of the crank 2 in different angular positions.

In the example illustrated in FIGS. 1 to 6, the positioning tip 7 can take on three different angular positions in the housing 4 of the crank 2.

These three angular positions of the positioning tip 7 are defined by three flat surfaces 8 that are placed uniformly on the periphery of the latter. These three flat surfaces are able to cooperate with three flat surfaces 9 that are uniformly provided inside the housing 4 of the crank. The angular difference of a position of the positioning tip 7 is therefore 120°.

So as to facilitate the installation of the positioning tip 7 inside the housing 4 of the crank 2, the peripheral surface of the tip is conical overall, as well as the surface of the wall of the housing, to be essentially complementary. The flat surfaces 8 and 9 are preferably slightly tilted toward the end of the tip 7 so as to form portions of an imaginary pyramid with three faces.

The means for securing the pedal shaft 5 inside the housing 4 of the crank comprise a threaded connection in the illustrated example in the figures. The threaded connection comprises here a threading provided at the end of the positioning tip 7 that thus forms a nut and that is able to cooperate with a threading 11 of a screw 12 that is placed on the other side of the housing to extend through a central through hole 13 of the housing 4 of the crank 2 (see FIGS. 5 and 6).

Figure 7:
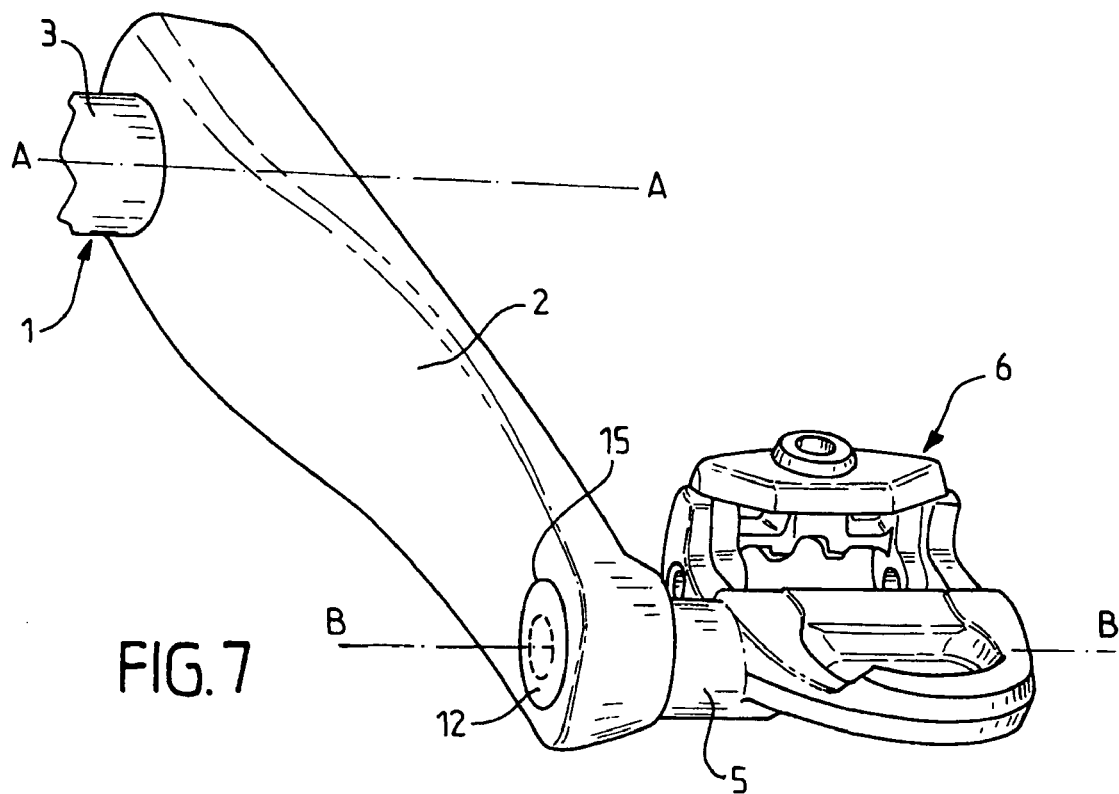
FIG. 7 is a perspective general outline showing a pedal connected to a crankset according to the invention.

The top 14 is flat and relatively thin and is housed in a recess 15 (see FIG. 6) when the screw 12 is screwed in the threading 10 of the positioning tip 7 so as to find—on the level of the surface—the crank of the same side (see FIG. 7).

Length L of the distance between centers between the crank shaft 2 and the pedal shaft 5 is extremely easy to regulate. If it is desired to obtain the shortest of the three possible lengths in the embodiment illustrated in FIGS. 1 to 6, it is sufficient to have the positioning tip 7 before the housing 4 such that the pedal shaft 5 is found in a first position that is the closest position of the crankset shaft 3 and then to introduce the positioning tip 7 into the housing 4 to secure it there with the help of securing means 10 to 12.

The second position of the positioning tip 7 in the housing 4 is an intermediate position in which the positioning tip 7 is rotated by 120° relative to the first position, and the third position corresponds to a position in which the pedal shaft 5 is rotated by 240° relative to the first position and is found to be the most removed from the pedal shaft 3.

Of course, it is suitable to make exactly the same adjustment of the other pedal shaft 5 so as to have the same length of distance between centers of the two sides.

In a variant of the first embodiment, a single flat surface 9 is carried out inside the housing 4 of the crank to work with three or more flat surfaces 8 on the positioning tip 7. The number of positions will actually depend only on the number of flat surfaces 8 on the tip.

Figure 8:
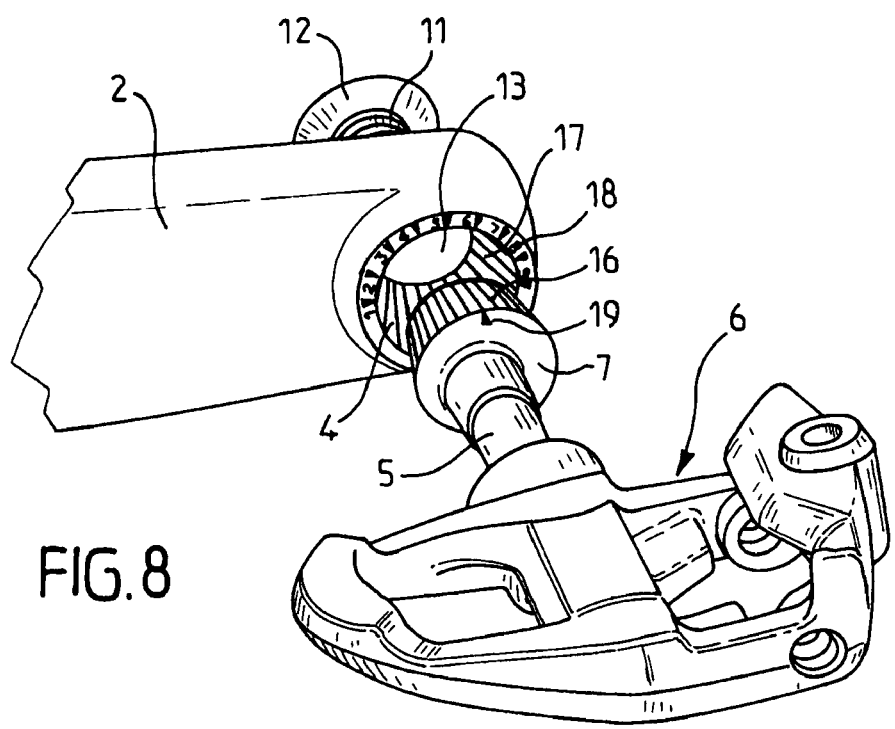
FIG. 8 is a perspective view illustrating an indexing variant of the crankset according to the invention.

Finally, FIG. 8 shows a second embodiment in which the periphery of the positioning tip 7 comprises a large number of contiguous flat surfaces 16 that form facets corresponding to contiguous flat surfaces 17 that form facets on the wall of the housing 4 of the crank 2. The positioning tip 7 thus has a conical prismatic shape like the one that is illustrated in FIG. 8.

The large number of facets 16 and 17 provides a significant number of possibilities of angular positioning of the positioning tip 7 inside the housing 4 and so as to ensure exactly the same positioning of the two pedal shafts 5, indexing means of the positioning tip 7 are advantageously provided.

These indexing means comprise references 18 in numbers around the housing 4 of the crank 2 and a marking 19 in the form of an arrow on the face of the positioning tip 7 rotated toward the pedal shaft 5.

It thus is easy to secure the positioning tip 7 of the pedal shaft 5 in the desired position to adjust the length L of the distance between centers, to raise the number 18 on which the arrow 19 points, and to make the same adjustment for the positioning tip 7 of the other pedal shaft.

In this manner, an adjustment of the length L of the distance between centers, which is virtually continuous, is obtained, and it is possible to be certain of obtaining exactly the same adjustment of the two sides.

The means that are proposed by the invention so as to use this adjustment of the length L of the distance between centers are particularly simple because they lack an insert and include very few parts.

The invention claimed is:

1. A cycle crankset, comprising:
   two cranks (2) that extend in opposite directions on both sides of a crankset shaft (3), whereby each crank (2) is connected to said crankset shaft (3) at one of its ends and has, at its opposite end, a housing (4) that can accommodate a free end of a pedal shaft (5) by defining a distance between centers (L) between said crankset shaft (3) and said pedal shaft (5), whereby said housing (4) is combined with means (10 to 12) for securing the pedal shaft (5) inside said housing (4); and
   a positioning tip (7) secured in an eccentric manner to said free end of said pedal shaft (5), whereby said positioning tip (7) is able to be accommodated in said housing (4) of the crank (2) in different angular positions so as to modify said distance between centers (L), whereby said angular positions are defined by flat surfaces (8; 16) placed uniformly on a periphery of said positioning tip (7) and are able to work with at least one flat surface (9; 17) that is provided inside said housing (4) of the crank (2), wherein a peripheral surface of said positioning tip (7) is conical as well as the surface of the wall of said housing (4) of the crank (2) so as to be complementary, and thereby said flat surfaces (8; 16) are tilted toward the end of said positioning tip, and wherein said at least one flat surface (9; 17) of said housing (4) has a same slope.

2. The cycle crankset according to claim 1, wherein said means (10 to 12) for securing the pedal shaft (5) inside said housing (4) comprise a threaded connection that comprises a screw (12) that passes through a central through hole (13) of said housing (4) to work with a threading (10) that is provided at the end of said positioning tip (7).

3. The cycle crankset according to claim 1, wherein at least three angular positions are provided.

4. The cycle crankset according to claim 1, wherein a significant number of contiguous flat surfaces (16) are provided so as to form facets of a positioning tip with prismatic shape (7).

5. The cycle crankset according to claim 1, wherein indexing means (18, 19) of said positioning tip (7) are provided.

6. The cycle crankset according to claim 5, wherein said indexing means comprise references (18) around said housing (4) and a marking (19) on the face of the positioning tip (7) that is rotated toward the pedal shaft (5).

7. A cycle, comprising the cycle crankset according to claim 1.

8. The cycle crankset according to claim 2, wherein at least three angular positions are provided.

9. The cycle crankset according to claim 2, wherein a significant number of contiguous flat surfaces (16) are provided so as to form facets of a positioning tip with prismatic shape (7).

10. The cycle crankset according to claim 2, wherein indexing means (18, 19) of said positioning tip (7) are provided.

11. The cycle crankset according to claim 3, wherein indexing means (18, 19) of said positioning tip (7) are provided.

12. The cycle crankset according to claim 4, wherein indexing means (18, 19) of said positioning tip (7) are provided.

13. The cycle crankset according to claim 10, wherein said indexing means comprise references (18) around said housing (4) and a marking (19) on the face of the positioning tip (7) that is rotated toward the pedal shaft (5).

14. The cycle crankset according to claim 11, wherein said indexing means comprise references (18) around said housing (4) and a marking (19) on the face of the positioning tip (7) that is rotated toward the pedal shaft (5).

15. The cycle crankset according to claim 12, wherein said indexing means comprise references (18) around said housing (4) and a marking (19) on the face of the positioning tip (7) that is rotated toward the pedal shaft (5).

16. A cycle crankset, comprising:
   a crankset shaft (3);
   two cranks (2) that extend in opposite directions on both sides of the crankset shaft (3), whereby each crank (2) is connected to said crankset shaft (3) at one of its ends and has, at its opposite end, a housing (4) that can accommodate a free end of a pedal shaft (5) by defining a distance between centers (L) between said crankset shaft (3) and said pedal shaft (5), whereby said housing (4) is combined with a device (10 to 12) for securing the pedal shaft (5) inside said housing (4); and
   a positioning tip (7) secured in an eccentric manner to said free end of said pedal shaft (5), whereby said positioning tip (7) is able to be accommodated in said housing (4) of the crank (2) in different angular positions so as to modify said distance between centers (L), whereby said angular positions are defined by flat surfaces (8; 16) placed uniformly on a periphery of said positioning tip (7) and are able to work with at least one flat surface (9; 17) that is provided inside said housing (4) of the crank (2),
   wherein a peripheral surface of said positioning tip (7) is conical as well as the surface of the wall of said housing (4) of the crank (2) so as to be complementary, and thereby said flat surfaces (8; 16) are tilted toward the end of said positioning tip, and wherein said at least one flat surface (9; 17) of said housing (4) has a same slope.

17. The cycle crankset according to claim 16, wherein said device (10 to 12) for securing the pedal shaft (5) inside said housing (4) comprises a threaded connection that comprises a screw (12) that passes through a central through hole (13) of said housing (4) to work with a threading (10) that is provided at the end of said positioning tip (7).

18. The cycle crankset according to claim 16, wherein at least three angular positions are provided.

19. The cycle crankset according to claim 16, wherein a significant number of contiguous flat surfaces (16) are provided so as to form facets of a positioning tip with prismatic shape (7).

20. The cycle crankset according to claim 16, wherein an indexing device (18, 19) of said positioning tip (7) is provided.

* * * * *